United States Patent Office 3,021,360
Patented Feb. 13, 1962

3,021,360
3-ACETOXY-4,4-DIPHENYL-6-METHYL-
AMINOHEPTANE
Albert Pohland, Indianapolis, Ind., assignor to Eli Lilly and Company, Indianapolis, Ind., a corporation of Indiana
No Drawing. Filed Mar. 25, 1959, Ser. No. 801,701
5 Claims. (Cl. 260—490)

This invention relates to a novel organic compound, 3 - acetoxy - 4,4 - diphenyl - 6 - methylaminoheptane, represented by the following formula:

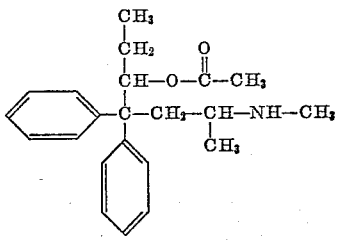

The above-represented compound possesses a high degree of analgesic activity.

The analgesic activity is surprising since it is known that other active analgesic agents which have a tertiary amino function lose the greater part of their activity when the tertiary amino group is converted to a secondary amino group. Thus, for example, the highly effective analgesics, morphine, codeine and methadone, all of which contain methylated tertiary amino groups, are converted to compounds which are substantially devoid of analgesic activity when the tertiary amino group is converted to a secondary amino group by the removal of one of the N-methyl substituents.

It will be noted that the compound represented by the above formula possesses two differently constituted asymmetric carbon atoms. Accordingly, different forms of the compound are possible, these consisting of two diastereoisomers, each of which can be resolved into dextro- and levorotatory isomers. Since it is not possible at present to assign an absolute spacial configuration to the two diastereoisomers, they have been arbitrarily distinguished as α- and β-isomers, the designation α- having been given to that diastereoisomer, or more properly, racemic diastereoisomeric pair, whose hydrochloride salt has a melting point higher than that of the other, or β-diastereoisomer.

Although the α- and β-forms of the above-represented aminoheptane compound have substantially the same analgesic activity, the d- and l-forms of each diastereoisomeric pair show different activities. Thus, the dextrorotatory isomer of the α-diastereoisomeric pair has a greater analgesic activity than its levorotatory enantiomorph. Optical isomers frequently exhibit different degrees of pharmacological activity, and hence the difference in activity noted above is not unexpected. It is possible to resolve each dl-diastereoisomer into its opitcal activity form by customary resolution procedures, but the advantages of such resolution are in general outweighed by the disproportionate amount of time and effort consumed by the resolution with respect to the advantage gained by an increased analgesic effectiveness.

Also included within the scope of this invention are the acid addition salts of 3-acetoxy-4,4-diphenyl-6-methylaminoheptane. Ilustrative acid addition salts include those prepared from inorganic acids, such as hydrochloric, hydrobromic, sulfuric, and phosphoric acids, and from organic acids, such as acetic, benzoic, maleic, succinic, citric, and 2,4-dihydroxynaphthoic acids. The salts are readily prepared by customary methods as by treating the free amine base with a stoichiometric equivalent of the acid, preferably in the presence of a solvent. The salt thus formed can be isolated by evaporation of the solvent or by filtration, depending upon the solubility of the salt in the solvent. In the event the salt is to be employed for therapeutic purposes, the acid used for salt formation should, of course, be one which does not contribute substantially to the toxicity of the analgesic base. Suitable nontoxic acid addition salts will be readily apparent to those skilled in the art.

The α- and β-forms of 3-acetoxy-4,4-diphenyl-6-methylaminoheptane are prepared by the reduction of 4,4-diphenyl-6-benzylmethylamino-3-heptanone to yield 4,4-diphenyl - 6 - benzylmethylamino - 3 - heptanol which subsequently is acetylated and then is debenzylated with palladium and hydrogen.

When the reduction is effected with lithium aluminum hydride the reduction product consists primarily of the α-form. A greater proportion of the β-form is obtained when the reduction is effected with sodium and alcohol.

The 4,4 - diphenyl - 6 - benzylmethylamino - 3 - heptanone, which is a novel compound, can be prepared by conventional procedures. For example, a suitable procedure comprises the following sequence of steps: Diphenylacetonitrile is reacted with N-benzyl-N-methyl-2-chloropropylamine to yield a mixture of 2,2-diphenyl-4-benzylmethylaminopentylnitrile and 2,2 - diphenyl - 3-methyl - 4 - benzylmethylaminobutylnitrile. The 2,2-diphenyl-4-benzylmethylaminopentylnitrile is separated and is reacted with ethyl magnesium bromide to produce 4,4 - diphenyl - 6 - benzylmethylamino - 3 - heptanone. The heptanone is then converted by reduction methods into the α- or β-form of the final product as set forth above.

Alternatively, if desired, the α-4,4-diphenyl-6-benzylmethylamino-3-heptanol which is obtained by the reduction of the corresponding ketone with lithium aluminum hydride can be debenzylated with a palladium catalyst and hydrogen by the above-described procedure to yield α - 4,4 - diphenyl - 6 - methylamino - 3 - heptanol. This compound (M.P. 172–173° C.) which has analgesic activity can be acetylated to yield α-4,4-diphenyl-6-methylamino-3-acetoxyheptane. The disadvantage of this alternate route lies in the concomitant production of an amount of diacetylated compound in which the secondary amino group as well as the hydroxyl group is acetylated.

The novel compounds of this invention can be employed parenterally or orally for analgesic purposes. Preferably, however, parenteral administration is used since an analgesic effect is secured with a lesser amount of material than is obtained by oral administration. Compositions suitable for therapeutic administration preferably comprise a sterile aqueous solution of a nontoxic water soluble acid addition salt of the analgesic base, although as will be understood, an aqueous or nonaqueous suspension of an acid addition salt can also be employed. For oral administration the analgesic base or an acid addition salt can be provided in any of the customary, orally administrable dosage forms, for example, compressed tablets, filled capsules, suspensions, elixers, and the like.

EXAMPLE 1

*Preparation of α-3-acetoxy-4,4-diphenyl-6-methylaminoheptane hydrochloride*

A mixture of 150 g. of diphenylacetonitrile and 36.5 g. of sodamide in 500 ml. of anhydrous benzene is heated to about 40° C. for about one-half hour to form the sodium salt of diphenylacetonitrile. 153 g. of N-benzyl-N-methyl-2-chloropropylamine in 150 ml. of anhydrous benzene are added dropwise with stirring to the reaction mixture, and after the addition is complete, the mixture is refluxed for about three hours. It is then cooled, is washed twice with 500 ml. portions of water, and the benzene is removed by evaporation in vacuo leaving as a residue a mixture of 2,2-diphenyl-4-benzylmethylaminopentylnitrile and 2,2-diphenyl-3-methyl-4-benzylmethylaminobutylnitrile. The residue is dissolved in a minimum quantity of anhydrous benzene and petroleum ether is added to the point of incipient precipitation. The mixture is cooled to 0° C. for 24 hours, during which time the 2,2 - diphenyl-3-methyl-4-benzylmethylaminobutylnitrile crystallizes. If desired, the crystals can be separated by filtration, and recrystallized from benzene-petroleum ether mixture. Purified 2,2-diphenyl-3-methyl-4-benzylmethylaminobutylnitrile melts at about 104–105° C.

The filtrates are combined and are evaporated to dryness in vacuo leaving as a residue 2,2-diphenyl-4-benzylmethylaminopentylnitrile. The residue is dissolved in ethyl acetate, and the solution is saturated with anhydrous gaseous hydrogen chloride to convert the free base to the corresponding hydrochloride salt. The hydrochloride salt is crystallized twice from acetone-ether mixture, yielding purified 2,2-diphenyl-4-benzylmethylaminopentylnitrile hydrochloride which melts at about 198–199° C. 2,2 - diphenyl - 4-benzylmethylaminopentylnitrile hydrochloride is converted to the free base by treatment with aqueous sodium hydroxide solution. The free base (39 g.) is dissolved in 125 ml. of toluene and the solution is added to 400 ml. of an ethereal solution of ethyl magnesium bromide prepared from 32.7 g. of ethylbromide and 7.3 g. of magnesium. After the addition is complete, the ether is removed by distillation and the remaining toluene solution is refluxed for about three hours. The reaction mixture is cooled and is poured into a mixture of 300 g. of ice and 100 ml. of 12 N hydrochloric acid to hydrolyze the imino ketone to the free ketone. The 4,4-diphenyl - 6-benzylmethylamino-3-heptanone hydrochloride which generally separates as an oil, is treated with an excess of 10 percent aqueous ammonium hydroxide to yield the free amine base. The free base is recovered by extracting the alkaline mixture with two 300 ml. portions of ether, and separating and evaporating the ether. The 4,4-diphenyl-6-benzylmethylamino-3-heptanone which is recovered as an oil is purified by distillation at about 212–214° C. at a pressure of about 0.3 mm. of mercury.

To a suspension of 1 g. of lithium aluminum hydride in 200 ml. of anhydrous ether are added 21.5 g. of 4,4-diphenyl-6-benzylmethylamino-3-heptanone in 100 ml. of anhydrous ether. After the addition is complete, the reaction mixture is heated at refluxing temperature for about two hours and is then decomposed by the addition of 30 ml. of a saturated ammonium chloride solution. The ether layer is separated by decantation from the precipitated inorganic salts; the salts are washed twice with 200 ml. portions of ether and the ether washings are combined with the original ether layer. The combined ether layers are dried and are saturated with anhydrous gaseous hydrogen chloride to cause the precipitation of the α-form of 4,4-diphenyl-6-benzylmethylamino-3-heptanol hydrochloride. The precipitates is separated by filtration and is recrystallized three times from an acetone-ether solvent mixture to yield purified α-4,4-diphenyl-6-benzylmethylamino-3-heptanol hydrochloride. It melts at about 178–179° C.

A reaction mixture of 5 g. of α-4,4-diphenyl-6-benzylmethylamino-3-heptanol hydrochloride, 5 ml. of anhydrous pyridine and 25 ml. of acetic anhydride is refluxed for about one hour. The mixture is cooled and the solvent is removed in vacuo. The residue comprising α-3-acetoxy-4,4-diphenyl-6-benzylmethylaminoheptane hydrochloride is dissolved in water. The aqueous solution is washed with 100 ml. of ether, and the aqueous layer is made alkaline with 15 N ammonium hydroxide. The α-3 - acetoxy - 4,4 - diphenyl-6-benzylmethylaminoheptane which separates is extracted with two 100 ml. portions of ether. The ether layers are separated, are combined and dried, and are saturated with anhydrous gaseous hydrogen chloride yielding a precipitate of α-3-acetoxy-4,4-diphenyl-6-benzylmethylaminoheptane hydrochloride. The hydrochloride salt is filtered off and is recrystallized several times from acetone-ether solvent mixture yielding purified α - 3-acetoxy-4,4-diphenyl-6-benzylmethylaminoheptane hydrochloride which melts at about 206–207° C.

To a solution of 8.0 g. of α-3-acetoxy-4,4-diphenyl-6-benzylmethylaminoheptane hydrochloride in 100 ml. of ethanol are added 2.0 g. of 5 percent palladium-on-carbon and the mixture is hydrogenated in a low pressure hydrogenation apparatus under a pressure of about 35 pounds of hydrogen until the theoretical quantity of hydrogen is adsorbed. The hydrogenated mixture is filtered to remove the catalyst, and the filtrate is evaporated to dryness in vacuo leaving as a residue α-3-acetoxy-4,4-diphenyl-6-methylaminoheptane hydrochloride. After a three-fold recrystallization from an acetone-ether solvent mixture, the compound melts at about 216–217° C.

α-3-acetoxy-4,4-diphenyl-6-methylaminoheptane hydrochloride is dissolved in a minimum amount of water and the solution is neutralized with cold 10 percent ammonium hydroxide. The α-3-acetoxy-4,4-diphenyl-6-methylaminoheptane which separates is extracted with ether, the ether extract is dried, and is evaporated to dryness yielding as a residue, α-3-acetoxy-4,4-diphenyl-6-methylaminoheptane. Recrystallization of the residue from petroleum ether yields purified α-3-acetoxy-4,4-diphenyl-6-methylaminoheptane.

EXAMPLE 2

*Preparation of β-3-acetoxy-4,4-diphenyl-6-methylaminoheptane hydrochloride*

43.7 g. of 4,4-diphenyl-6-benzylmethylamino-3-heptanone prepared by the method of Example 1 are dissolved in about 500 ml. of anhydrous ethanol and 26.2 g. of sodium are added at a rate sufficient to maintain gentle refluxing of the reaction mixture. After the addition of the sodium is completed, the reaction mixture is allowed to stand at ambient room temperature for about 16 hours. The ethanol is removed by evaporation in vacuo, leaving a mixture of the α- and β-forms of 4,4-diphenyl-6-benzylmethyl-amino-3-heptanol. The mixture is dissolved in 10 percent aqueous hydrochloric acid, the acid solution is washed with about 100 ml. of ether, and the aqueous layer is made alkaline with 14 N ammonium hydroxide, to precipitate β-4,4-diphenyl-6-benzylmethylamino-3-heptanol. The free base is extracted with 200 ml. of ether, the ether layer is separated and dried, and is treated with anhydrous gaseous hydrogen chloride to form β-4,4-diphenyl - 6-benzylmethylamino-3-heptanol hydrochloride. The insoluble hydrochloride salt is filtered off and is recrystallized three times from acetone-ether mixture, to yield purified β - 4,4 - diphenyl-6-benzylmethylamino-3-heptanol hydrochloride which melts at about 196–197° C.

β-4,4-diphenyl-6-benzylmethylamino-3-heptanol hydrochloride is acetylated with acetic anhydride in the presence of pyridine by the procedure described in Example 1 to yield β-3-acetoxy-4,4-diphenyl-6-benzylmethylaminoheptane hydrochloride. The hydrochloride salt melts at about 216–217° C. after a threefold recrystallization from acetone-ether solvent mixture.

3.8 g. of β-3-acetoxy-4,4-diphenyl-6-benzylmethylaminoheptane hydrochloride are dissolved in 100 ml. of anhydrous ethanol, 2.0 g. of 5 percent palladium-on-carbon are added and the mixture is hydrogenated by the procedure described in Example 1 to yield β-3-acetoxy-4,4-diphenyl-6-methylaminoheptane hydrochloride. After several recrystallizations from acetone-ether solvent mixture, the hydrochloride salt melts at about 197–198° C.

β-3-acetoxy-4,4-diphenyl-6-methylaminoheptane is prepared from its hydrochloride salt by the method described in Example 1 for the preparation of pure α-3-acetoxy-4,4-diphenyl-6-methylaminoheptane.

EXAMPLE 3

*Preparation of acid addition salts of 3-acetoxy-4,4-diphenyl-6-methylaminoheptane*

The α- or the β-form of 3-acetoxy-4,4-diphenyl-6-methylaminoheptane can be converted into salts, for example, the maleate salt, by adding a stoichiometric equivalent of the acid, e.g., maleic acid, to the diphenylheptane base in ethanol solution. The salt is recovered in solid form by evaporating the ethanol, preferably in vacuo. Other acid addition salts, for example, the hydrobromide, sulfate, fumarate, and citrate salts, can be prepared by the same procedure.

I claim:

1. A member of the group consisting of the organic base, 3-acetoxy-4,4-diphenyl-6-methylaminoheptane, and its acid addition salts, said base being represented by the following formula:

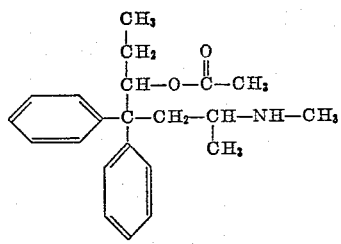

2. α-3-acetoxy-4,4-diphenyl-6-methylaminoheptane.
3. β-3-acetoxy-4,4-diphenyl-6-methylaminoheptane.
4. α-3-acetoxy-4,4-diphenyl-6-methylaminoheptane hydrochloride.
5. β-3-acetoxy-4,4-diphenyl-6-methylaminoheptane hydrochloride.

References Cited in the file of this patent

UNITED STATES PATENTS

| | | |
|---|---|---|
| 2,565,592 | Clark | Aug. 28, 1951 |
| 2,649,445 | Speeter | Aug. 18, 1953 |

OTHER REFERENCES

Leimbach: J. Pharmacol. Exp. Therap. 110, 135–147 (1954).

Suter: "Medicinal Chemistry," 1951, pp. 390–437.